J. H. Duck & E. K. Whitcomb.
*Improvement in Pipes and Fixtures for Driven Wells.*
Said Whitcomb having assigned to right, title and interest in said improvement to
*James T. Whipple* of *Chicago, Ill.*
ISSUED FEB 21 1871
4267
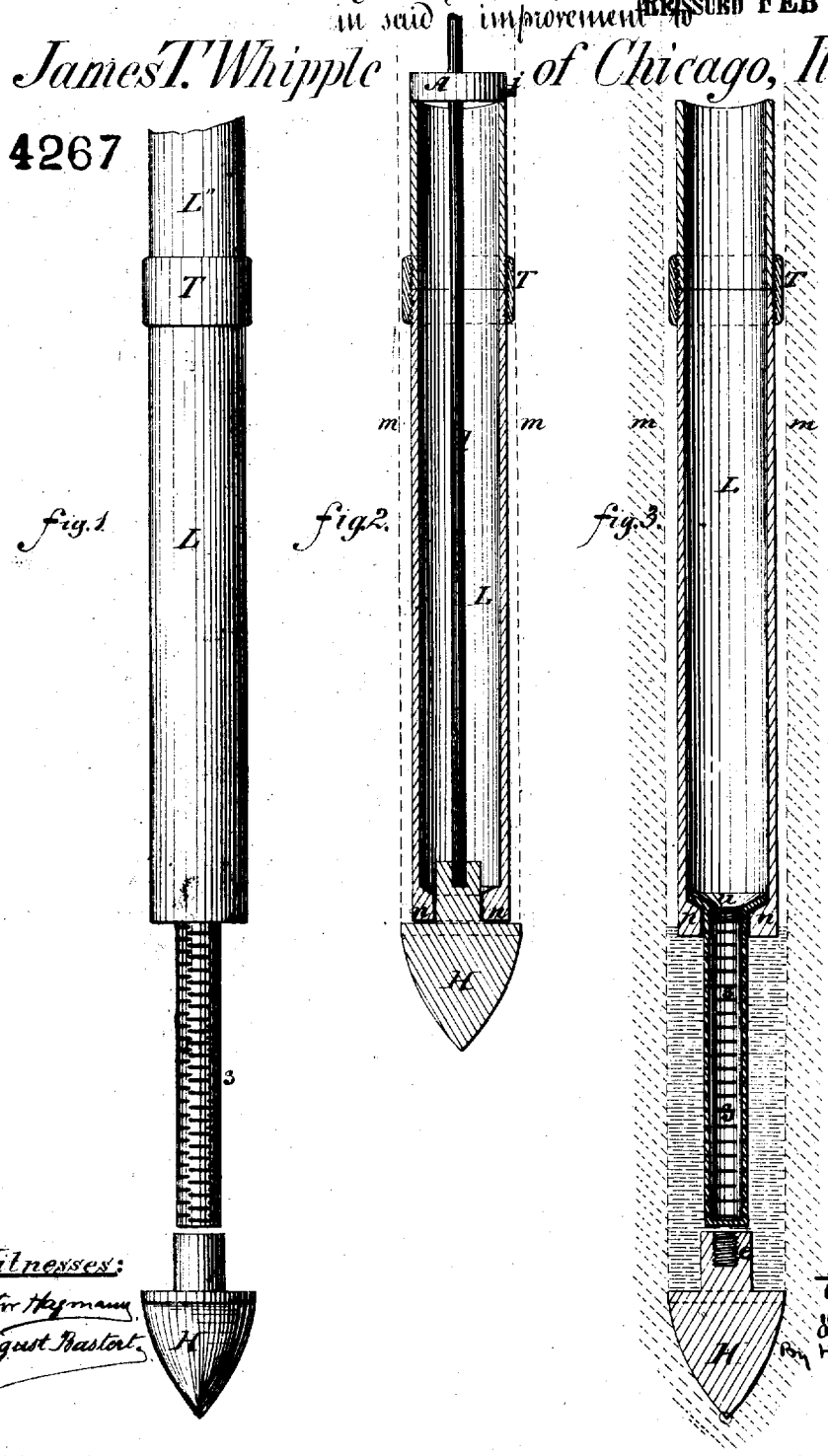
Witnesses:
Peter Hagmann
August Rastert
Inventors
J. H. Duck
E. K. Whitcomb
By Hill & Clemons
attorneys

UNITED STATES PATENT OFFICE.

JOHN H. DUCK and ELIAS K. WHITCOMB, OF ELGIN; SAID WHITCOMB ASSIGN
HIS INTEREST TO JAMES T. WHIPPLE, OF CHICAGO, ILLINOIS.

Letters Patent No. 58,721, dated October 9 1866; reissue No. 4,267, dated February 21, 1871.

IMPROVEMENT IN PIPES AND FIXTURES FOR WELLS.

The Schedule referred to in these Letters Patent and making part of the same.

*To all whom it may concern:*

Be it known that we, JOHN H. DUCK and ELIAS K. WHITCOMB, both of the city of Elgin, in the county of Kane and State of Illinois, have invented certain new and useful Improvements in Pipes and Fixtures for Driven Wells; and we do hereby declare that the following is a full, clear, and exact description of the same, reference being had to the accompanying drawing forming part of this specification, in which—

Figure 1 is an elevation of the pipe and fixtures;

Figure 2 is a vertical section of the pipe and point, showing the means for attaching and detaching the same; and Figure 3 is a vertical section, showing the respective parts inserted in the well in position for use.

Similar letters of reference in the drawing indicate corresponding parts.

Our invention consists in—

First, forcing or driving a pipe into the ground to any given depth, detaching the point, and then suspending at the bottom of the pipe a perforated tube or screen, in such a manner as to bring its filtering surface in direct contact with the water-course, and still admit of its being withdrawn, replaced, or removed at pleasure by passing it through the main pipe; and, Second, in the shape of the point, and the manner of adjusting the same.

In the construction of driven wells the lower end of the tube forming the well is usually provided with a sharp metal point, to facilitate the operation of driving, and with a filter, through which the water passes into the well.

The filter has usually been formed by perforating the lower end of the tube and surrounding it with wire-cloth, coils of wire, and other similar devices, or by inserting a cylindrical screen within the tube, covering the perforations.

These methods are both objectionable, for the reason, first, that the exterior screen is liable to be be injured or destroyed by contact with the surrounding earth while the tube is being driven; and, secondly, when the interior screen is used there is great danger of the earth packing, in a short time, so firmly between the outer tube and the screen as to exclude the water.

The changing of screens after the well is driven is oftentimes an absolute necessity, owing to the diversity of soils in water-courses; and it is also requisite that the finest perforations of the screen shall be at its outer surface, and that no part of the well-tube shall interpose between this surface and the water-course.

By our method of adjusting the screen in the water-course after the main pipe is driven, having previously detached the point from said pipe, we accomplish the above results, obviating the necessity of withdrawing the main tube to effect a change of screens, as also the damage incident to that class of screens permanently affixed to the main pipe and exposed to its vicissitudes while being driven to the water-course.

In the drawing—

L represents the pipe, which is of iron or other suitable metal, made in sections and coupled together, as shown at T.

The lower end of this pipe is provided with an interior flange, *n*, which forms a socket or collar for the attachment of the conical metal point H.

The upper portion of this point consists of a central shank, which enters the socket of the pipe L, leaving a shoulder upon which the end of the pipe rests while being driven, thus giving great strength for driving purposes, holding the point to a perpendicular position while being driven, and admitting of its detachment from the pipe after the well is driven.

S is the filter or screen, constructed in the form of a perforated tube, and provided, upon its upper end, with a flange, N, which rests upon the flange *n* of pipe L, to hold the filter in position. This tube may be made of sheet metal, and covered, when necessary, with wire cloth of any kind. Its upper end is provided with an internal screw-thread, to receive a corresponding thread upon an adjusting-rod.

In the act of driving the pipe L, should its progress be arrested by coming in contact with rock or other hard substance, and it is desired to withdraw the point with the pipe, we employ the arrangement shown in fig. 2, viz., the rod *l*, having its lower end provided with a screw-thread adapted to screw into the opening *c* in the shank of the point, and an adjustable clamp or collar, A, and supported by the upper end of the pipe, by which means the pipe and point are clamped firmly together to be withdrawn.

In driving a well the operation is as follows:

The shank of the point H being inserted in the socket or collar of pipe L, as shown at fig. 2, the first section is driven into the ground its entire length. A second section is then attached to the first, and so on until the required depth is reached. The pipe is then withdrawn from two to three feet, detaching the point and leaving it at the bottom of the well, by which means a space is left between the point and the end of the pipe, to collect the water.

The screen or filter S is now inserted in the pipe, and suspended therein by the flanges N *n*, with its perforated portion projecting into the water-space, as shown in fig. 3.

A suitable pump is then attached to the pipe, which completes the mechanical portion of the work.

Having thus described our invention,

What we claim as new is—

1. In driven wells, a screen, when suspended within the main tube and detached from the point, the filtering surface projecting below the main tube into the water-course, substantially as described, and for the purpose specified.

2. The detachable point H, constructed as described, with its its shank adapted to be inserted into the collar of the pipe L while being driven, substantially as and for the purpose specified.

3. The main tube L and the removable suspended screen S, detached from the point H, adapted for connection with a pump, for the purpose specified.

JOHN H. DUCK.
ELIAS K. WHITCOMB.

Witnesses:
A. B. WHITCOMB,
A. O. RAWLINGS.